Feb. 13, 1940. C. P. SWEENY 2,190,223
ELECTRIC MOTOR
Filed Jan. 27, 1938

Inventor
Charles P. Sweeny
By Barnes, Kisselle, Laughlin & Raisch,
Attorneys

Patented Feb. 13, 1940

2,190,223

UNITED STATES PATENT OFFICE 2,190,223

ELECTRIC MOTOR

Charles P. Sweeny, Detroit, Mich., assignor to Vickers, Incorporated, Detroit, Mich., a corporation of Michigan Application January 27, 1938, Serial No. 187,261

13 Claims. (Cl. 172—274)

This invention relates to electric motors and more particularly to a motor employed as a torque relay so as to follow the movement of a control device electrically connected thereto.

An object of the present invention is, therefore, to provide a motor which will accurately follow the movement of a control device electrically connected thereto.

Another object of the invention is to provide a motor producing high torque and following the movement of a control device requiring no substantial amount of torque for its operation.

A further object of the invention is to provide a motor operating as a torque relay and developing high torque in assuming a position corresponding to the position of a control device.

A still further object of the invention is to provide a motor having both alternating current and direct current energization in which the direct current energization is varied by a control device to vary the reactance of the alternating current windings of the motor and cause the rotor thereof to move in accordance with the movement of the control device.

Other objects and advantages of the invention will appear in the following description of preferred embodiments of the invention given in conjunction with the attached drawing, of which:

Figure 1:
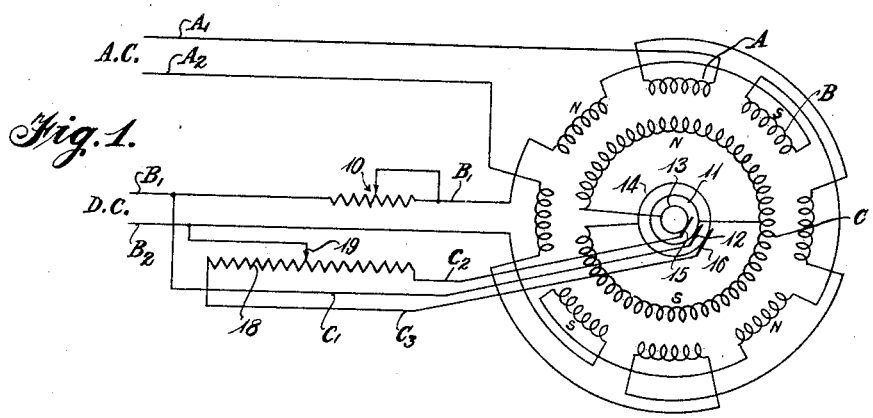
Figure 1 is a schematic drawing of one form of motor and control device.

Referring to Figure 1 of the drawing, the motor is provided with a single phase alternating current primary winding A. In the example illustrated, this winding is positioned on the stator and arranged to produce four poles and is connected to an alternating current source by the conductors $A_1$ and $A_2$. A D. C. control winding B is also shown as a four-pole winding on the stator and has its poles positioned 90 electrical degrees from the poles of the A. C. winding. The D. C. control winding B is connected through an adjustable resistor 10 and conductors $B_1$ and $B_2$ to a D. C. source of power. This resistor is employed to adjust the average torque of a motor.

A secondary winding C is shown as a two-pole winding positioned upon the rotor and arranged to be energized by direct current so as to have the relative energization of the poles thereof varied. To accomplish this, one end of each of the coils thereof is connected through a common slip ring 11, collector 12 and conductors $C_1$ and $B_1$ to the D. C. source. The other ends of the coils of the secondary winding are each connected through separate slip rings 13 and 14, collectors 15 and 16 and conductors $C_2$ and $C_3$, respectively, to opposite ends of a control resistor 18. An adjustable slider or contact 19 for the resistor 18 and connected to the conductor $B_2$ completes the circuit to the other side of the D. C. source. All of the windings A, B and C are preferably distributed windings in slots in the iron of the motor members and in some cases the A and B windings may overlap so that some or all of the conductors of the B winding are positioned in slots occupied by conductors of the A winding. It will be noted that the control winding B has a different number of poles than the secondary winding C. The number of poles of these windings may be varied as long as this relation is maintained but the greatest range of movement is produced when one of these windings has twice the number of poles provided by the other and the arrangement shown, in which the control winding has the greater number of poles, is preferred.

Considering only the D. C. windings B and C, and assuming that the connections are such as to produce the poles indicated on the drawing, the rotor will assume the position shown with the respective rotor poles intermediate the stator poles when the rotor poles are equally energized, that is, when the contact 19 of resistor 18 is in its center position. If, for example, the contact 19 is moved to the right in Figure 1, the pole of the secondary winding B, indicated as the north pole, will be energized to a greater extent and the energization of the south pole correspondingly weakened. It will be found that in this case, the flux of the north pole will be more strongly concentrated at the center of this pole than the flux of the south pole and the rotor will rotate to the right and assume a position with the north pole of the secondary winding nearer a south pole of the control winding. However, with only D. C. energization, it is difficult to make the rotor accurately follow the movement of the contact arm 19 and the pull-in torque, that is, the torque tending to cause the rotor to assume a position corresponding to the position of the slider 19 is low and becomes increasingly lower as the rotor approaches the corresponding position.

Considering also the A. C. primary winding, this winding is single phase and the secondary winding is positioned so that no substantial resultant voltages are induced therein by the A. C. flux under balanced conditions so that no resultant torque is produced in the rotor due to the A. C. energization under these conditions. One way of accomplishing this is to employ a different member of poles for the primary winding than for the secondary winding and preferably by employing a greater number of poles for the primary winding than for the secondary winding. The control winding B should also be positioned so that under balanced conditions no substantial resultant voltages are induced therein by the A. C. flux due to energization of the primary winding.

This can be accomplished by employing similar windings having the same number of poles for the primary and control windings and positioning the poles at 90 electrical degrees from each other, although by changing the pitch of one or both of these windings other angular relations can be employed and also substantially the same result can be reached by employing a different number of poles for the primary and control windings. In any case the control winding should be connected so that voltages induced by the A. C. flux, under balanced conditions, oppose each other so that no substantial alternating currents are produced in the control windings, under these conditions. The arrangement shown is preferred.

When the contact 19 is moved, the balance condition is destroyed, that is, the A. C. field of the primary winding is modified by the D. C. field of the secondary winding so that resultant voltages are induced in the secondary winding by the combined A. C. and D. C. fields to produce torque in the same direction as that produced by the D. C. windings alone. In the device illustrated the variation in the D. C. energization of the secondary winding C and the resultant different distribution of D. C. flux due to this winding varies the saturation of the iron in the rotor and also in the stator adjacent the alternating current windings so as to vary the reactance of the various coils of the A. C. or stator winding. As stated above, the result is to produce a torque in the same direction as that due to the D. C. fields, as the modification of the A. C. field by the field due to the change in the field of the secondary winding causes power currents to flow in the secondary windings to develop a torque in the same direction as that of the D. C. fields. Also as soon as the rotor starts to move, a rotating field is produced in the same manner as in a single phase induction motor. This further increases the torque to cause the rotor to move toward a position corresponding to that of the contact 19. When the above mentioned unbalanced condition is produced, resultant voltages are also induced in coils of the control winding B due to the modification of the A. C. flux to cause A. C. current to flow therein and also the above-mentioned rotating field induces voltages in the B winding which cause A. C. currents to flow therein. This winding becomes a power winding which produces a field supplying torque in the desired direction during initial movement of the rotor and opposing torque to stop the rotor as it approaches a position corresponding to the contact 19 so that the rotor pulls into said corresponding position with high torque but has no tendency to overrun.

The D. C. control winding B in conjunction with the primary winding C also controls the saturation of the iron of the motor and, therefore, the impedance to alternating current of the primary winding A and the secondary winding C as well as the control winding B so as to determine the magnitude of the alternating currents flowing in these windings and therefore, the average torque of the motor. The resistor 10 controls the D. C. voltage applied to the control winding B and, therefore, the effective torque of the motor. In a given installation, the necessary voltage for the torque desired will ordinarily be predetermined and the windings designed in accordance with existing voltages to produce the required torque such that the resistor 10 can be eliminated.

After movement of the contact arm 19, the rotor will move and approach a new balanced position. When at this position, the torque produced by the D. C. windings alone and that produced by the A. C. energization as the result of the unbalanced condition as well as the torque produced by alternating currents in the B winding will resist the torque due to single phase induction motor action to stop the motor at the new position. Thus the motor will follow the movement of the contact 19, at high torque, maintain this torque during movement, and pull into the new position with this high torque. The magnitude of this torque is easily adjusted to fit the requirements of a particular installation by an adjustment of the resistor 10 or by correct design of the D. C. and A. C. windings.

Figure 2:
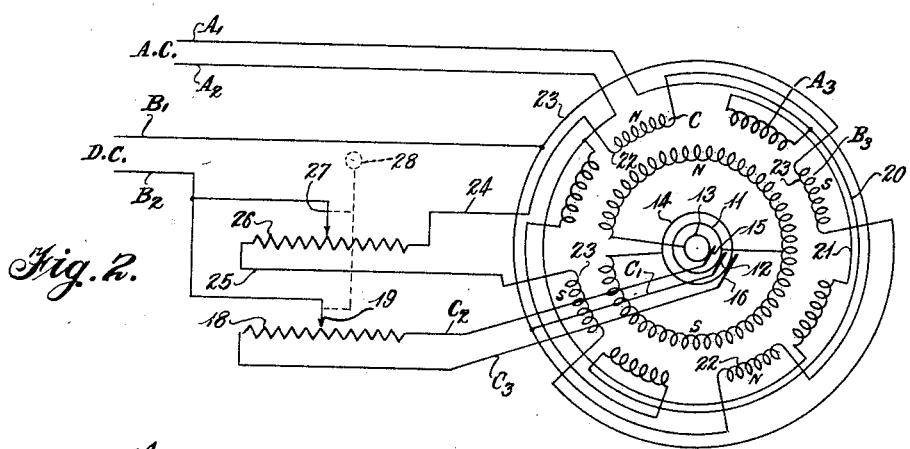
Figure 2 is a similar view of a modification of the device.

In Figure 2 a modification of the device of Figure 1 is shown, and differs therefrom in that the relative energization of the poles of the D. C. control winding $B_3$ may also be varied simultaneously with that of the D. C. primary winding $C_3$. The control winding $B_3$ has also been positioned asymmetrically with respect to the primary winding $A_3$ in order to produce a stronger torque in one direction than in the other and the winding $A_3$ has been divided into two circuits 20 and 21, as for a lower voltage, to illustrate that various connections are possible.

To vary the relative energization of the poles of the windings $B_3$, this winding has been divided into two circuits 22 and 23, one end of each of which has been connected to the D. C. source by conductor $B_1$. The other ends of the circuits 22 and 23 are connected by conductors 24 and 25, respectively, to the opposite ends of a control resistor 26 having a contact 27 connected to a conductor $B_2$ from D. C. source to complete the D. C. circuit through the winding $B_3$. The contacts 19 and 27 are arranged for simultaneous operation as indicated by the member 28 shown in dotted lines and the resistors are so connected that the north poles of the winding $B_3$ have their energization increased as the south poles of the windings $C_3$ have their energization increased and vice versa. Thus the variation of the energization of the poles of the winding $B_3$ adds to the variation of the energization of the poles of the winding $C_3$ so that the effects discussed with respect to Figure 1 are increased. By properly designing the resistors 18 and 26, the motor may be made to faithfully follow the movement of the contacts 19 and 27 and, for example, have its rotor move the same angle as the knob of a double rheostat. As stated before, this motor has a stronger torque in one direction than in the other but the torque may be made the same in both directions by symmetrically positioning the D. C. stator winding with respect to the A. C. stator winding as in Figure 1. Thus the position of the D. C. stator winding controls the relative magnitude of the torque in the different directions of rotation and the degree of energization thereof controls the amount of the torque.

Figure 3:
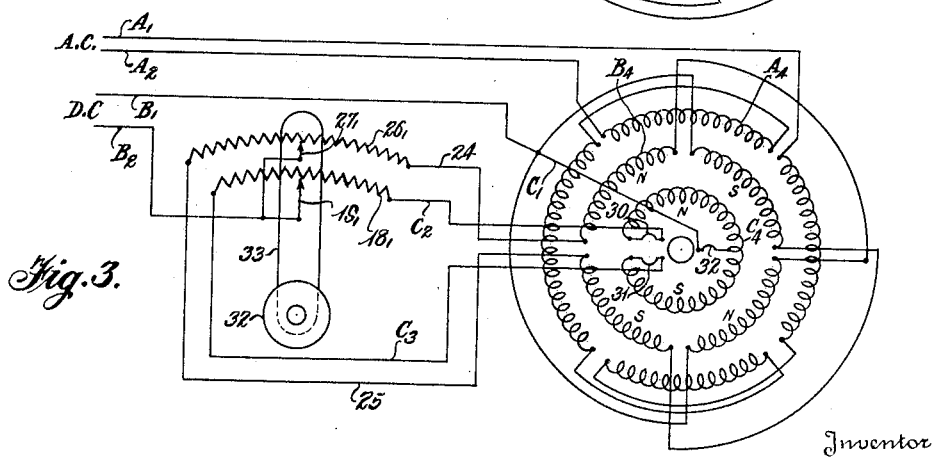
Figure 3 is a similar view of a further modification of the device.

In Figure 3 a still further modification of the device is disclosed. This modification is provided with an alternating current primary winding $A_4$ which is similar to the winding A of the motor of Figure 1 but is shown as having its windings distributed entirely around the stator. The direct current control winding $B_4$ is similar to the winding $B_3$ of Figure 2 but is symmetrically placed with respect to the A. C. stator winding $A_4$ so that the motor has equal torque in both directions and is also shown as having its windings distributed entirely around the rotor. This can be accomplished by positioning conductors of both the A and B windings in the same slots in the stator. The secondary winding $C_4$ is similar to the windings C and $C_3$ of Figures 1 and 2, respectively, but is provided with flexible connectors 29, 30 and 31 instead of the slip rings and collectors shown in Figures 1 and 2. This is possible since the motor is designed to make only a partial revolution.

The control device is shown diagrammatically as a double rheostat provided with a knob 32 and contact arm 33 upon which contacts 19' and 27' are positioned. The contact 19 engages an arcuate resistor 18' connected to the flexible connections 30 and 31 by the conductors $C_2$ and $C_3$, respectively, and the flexible connection 29 is connected to the D. C. source by the conductors $C_1$ and $B_1$. The contact 27' engages an arcuate resistor 26' connected to opposite ends of the D. C. stator winding $B_4$ by conductors 24 and 25. The contacts 19' and 27' are connected to a conductor $B_2$ to complete the circuits through the D. C. windings $B_4$ and $C_4$. The device of Figure 3 operates exactly the same as that of Figure 2 except that the torque is the same in both directions. By properly designing the resistors 18' and 26' the rotor of the motor can be made to assume the same angular position as that of the rheostat knob 32 and accurately follow the movement of this knob while developing high available torque.

It is to be noted that the devices of either Figures 2 or 3 will operate in the same manner as that of Figure 1 if the energization of the control winding is allowed to remain constant and the relative energization of the poles of opposite polarity of the secondary winding is varied. Furthermore, the devices of either Figures 2 or 3 will operate in a similar manner, if the relative energization of the poles of opposite polarity of the control winding is varied and the energization of the secondary winding allowed to remain constant. Thus the various forms of the device illustrated function as torque relays or amplifiers since a small force of torque applied to the rheostat or similar control device is amplified by the motor which follows the movement of the control device.

While applicant has disclosed his invention in detail and has indicated certain theories of operation thereof, it is understood that the invention is not to be limited to any theories of operation or the particular details disclosed but can be varied within the scope of the following claims.

What I claim is:

1. In a torque relay system, a source of alternating current power, a source of direct current power, an electric motor having a stationary member and a rotatable member, a first winding upon one of said members energized from said source of alternating current power, a second winding upon the other of said members energized from said source of direct current power, a third winding upon said one of said members energized from said source of direct current power, said second winding being divided into sections, and means for differentially varying the direct current energization of said sections.

2. In a torque relay system, a source of alternating current power, a source of direct current power, an electric motor having a stationary member and a rotatable member, a first winding upon one of said members energized from said source of alternating current power, a second winding upon the other of said members energized from said source of direct current power, a third winding upon said one of said members energized from said source of direct current power, said second winding being divided into sections, means for differentially varying the direct current energization of said sections, said third winding being divided into sections, and means for differentially varying the direct current energization of the sections of said third winding.

3. In a torque relay system, a source of alternating current power, a source of direct current power, an electric motor having a stationary member and a rotatable member, a first winding upon one of said members energized from said source of alternating current power, a second winding upon the other of said members energized from said source of direct current power, a third winding upon said one of said members energized from said source of direct current power, said second winding being divided into sections, means for differentially varying the direct current energization of said sections, said third winding being divided into sections, and means for simultaneously differentially varying the direct current energization of the sections of said third winding.

4. In a torque relay system, a source of single-phase alternating current power, a source of direct current power, an electric motor having a stationary member and a rotatable member, a first distributed winding upon one of said members energized from said source of alternating current power, a second distributed winding upon the other of said members energized from said source of direct current power, a third distributed winding upon said one of said members energized from said source of direct current power, said second winding being divided into circumferentially disposed sections, and means for differentially varying the direct current energization of alternate sections of said second winding.

5. In a torque relay system, a source of single-phase alternating current power, a source of direct current power, an electric motor having a stationary member and a rotatable member, a first distributed winding upon one of said members energized from said source of alternating current power, a second distributed winding upon the other of said members energized from said source of direct current power, a third distributed winding upon said one of said members energized from said source of direct current power, said second winding being divided into circumferentially disposed sections, means for differentially varying the direct current energization of alternate sections of said second winding, said third winding being divided into circumferentially disposed sections, and means for differentially varying the direct current energization of alternate sections of said third winding.

6. In a torque relay system, a source of single-phase alternating current power, a source of direct current power, an electric motor having a stationary member and a rotatable member, a first distributed winding upon one of said members energized from said source of alternating current power, a second distributed winding upon the other of said members energized from said source of direct current power, a third distributed winding upon said one of said members energized from said source of direct current power, said second winding being divided into circumferentially disposed sections, means for differentially varying the direct current energization of alternate sections of said second winding, said third winding being divided into circumferentially disposed sections, and means for simultaneously differentially varying the direct current energization of alternate sections of said third winding.

7. In a torque relay system, a source of single-phase alternating current power, a source of direct current power, an electric motor having a stationary member and a rotatable member, a first winding upon one of said members energized from said source of alternating current power, a second winding upon the other of said members energized from said source of direct current power, a third winding upon said one of said members energized from said source of direct current power, said second winding being divided into circumferentially disposed sections, and means for differentially varying the direct current energization of alternate sections of said second winding.

8. In a torque relay system, a source of single-phase alternating current power, a source of direct current power, an electric motor having a stationary member and a rotatable member, a first winding upon one of said members energized from said source of alternating current power, a second winding upon the other of said members energized from said source of direct current power, a third winding upon said one of said members energized from said source of direct current power, said second winding being divided into circumferentially disposed sections, means for differentially varying the direct current energization of alternate sections of said second winding, said third winding being divided into circumferentially disposed sections, and means for simultaneously differentially varying the direct current energization of alternate sections of said third winding.

9. In a torque relay system, a source of single-phase alternating current power, a source of direct current power, an electric motor having a stationary member and a rotatable member, a first winding upon one of said members energized from said source of alternating current power, a second winding upon the other of said members energized from said source of direct current power, a third winding upon said one of said members energized from said source of direct current power, said second and third windings being divided into circumferentially disposed sections, said third winding having a different number of sections than said second winding, and means for differentially varying the direct current energization of alternate sections of said second winding.

10. In a torque relay system, a source of single-phase alternating current power, a source of direct current power, an electric motor having a stationary member and a rotatable member, a first winding upon one of said members energized from said source of alternating current power, a second winding upon the other of said members energized from said source of direct current power, a third winding upon said one of said members energized from said source of direct current power, said second and third windings being divided into circumferentially disposed sections, said third winding having a different number of sections than said second winding, and means for differentially varying the direct current energization of alternate sections of said second winding and simultaneously differentially varying the direct current energization of alternate sections of said third winding.

11. In a torque relay system, a source of alternating current power, a source of direct current power, an electric motor having a stationary iron member and a rotatable iron member, a first winding upon one of said members energized from said source of alternating current power, a second winding upon the other of said members energized from said source of direct current power, a third winding upon said one of said members energized from said source of direct current power, said second winding being divided into circumferentially disposed sections, and means including a movable member for differentially varying the direct current energization of alternate sections of said second winding whereby movement of said movable member will cause corresponding movement of the rotatable member of said motor.

12. In a torque relay system, a source of alternating current power, a source of direct current power, an electric motor having a stationary iron member and a rotatable iron member, a first winding upon one of said members energized from said source of alternating current power, a second winding upon the other of said members energized from said source of direct current power, a third winding upon said one of said members energized from said source of direct current power, said second winding being divided into circumferentially disposed sections, and means including a resistance element and a movable contact member for differentially varying the direct current energization of alternate sections of said second winding whereby the rotatable member of said motor will move to a new position when said contact member is moved to another position.

13. In a torque relay system, a source of single-phase alternating current power, a source of direct current power, an electric motor having a stationary iron member and a rotatable iron member, a first winding upon one of said members energized from said source of alternating current power, a second winding upon the other of said members energized from said source of direct current power and divided into circumferentially disposed sections, a third winding upon said one of said members energized from said source of direct current power and divided into circumferentially disposed sections, means including a resistance element connected across said second winding, a resistance element connected across said third winding, a movable contact member for each of said resistance elements for differentially varying the direct current energization of alternate sections of said second winding and simultaneously varying the direct current energization of alternate sections of said third winding upon movement of said contact members, and means for simultaneously moving said contact members whereby the rotatable member of said motor will move to a different position upon movement of said contact moving means.

CHARLES P. SWEENY.